(12) United States Patent
Sabino et al.

(10) Patent No.: US 11,217,014 B2
(45) Date of Patent: Jan. 4, 2022

(54) TOPOLOGICAL SURFACE DETECTOR

(71) Applicant: The Boeing Company, Chicago, IL (US)

(72) Inventors: John-Paul Nathaniel Sabino, Redmond, WA (US); Richard Joel Thompson, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 86 days.

(21) Appl. No.: 16/783,877

(22) Filed: Feb. 6, 2020

(65) Prior Publication Data

US 2021/0248818 A1    Aug. 12, 2021

(51) Int. Cl.
*G06T 17/20* (2006.01)
*G06F 13/16* (2006.01)

(52) U.S. Cl.
CPC .......... *G06T 17/20* (2013.01); *G06F 13/1668* (2013.01)

(58) Field of Classification Search
CPC ............................ G06T 17/20; G06F 13/1668
See application file for complete search history.

(56) References Cited

U.S. PATENT DOCUMENTS

| | | | | |
|---|---|---|---|---|
| 6,108,006 A * | 8/2000 | Hoppe | ............... | G06T 17/20 345/420 |
| 6,137,492 A * | 10/2000 | Hoppe | ............... | G06T 17/20 345/418 |
| 2005/0018901 A1* | 1/2005 | Kaufmann | .......... | G06T 17/20 382/154 |
| 2005/0021318 A1* | 1/2005 | Inoue | .................. | G06K 9/469 703/2 |
| 2010/0238166 A1* | 9/2010 | Tamstorf | ........... | G06K 9/6892 345/420 |
| 2018/0012407 A1* | 1/2018 | Chuang | ................. | G06T 7/75 |
| 2018/0232950 A1* | 8/2018 | Brewer | ............... | G01V 99/005 |
| 2018/0287876 A1* | 10/2018 | Strobel | ................ | H04L 41/12 |
| 2019/0035129 A1* | 1/2019 | Hutchinson | ......... | G06T 17/05 |
| 2020/0265611 A1* | 8/2020 | Hemmer | ............... | G06T 9/00 |

* cited by examiner

*Primary Examiner* — Michael Le
(74) *Attorney, Agent, or Firm* — Yee & Associates, P.C.

(57) ABSTRACT

A method of identifying surfaces within a discretized mesh model is provided. The method comprises identifying a number of faces in the mesh model and constructing an adjacency graph of connections between the faces. A value is assigned to each connection in the adjacency graph according to a metric of similarity between incident faces of the connection. Connections with a metric of similarity value that satisfies a prescribed policy of elimination are removed from the adjacency graph. From the remaining connections in the adjacency graph a number of strongly connected components in the mesh model are determined.

27 Claims, 9 Drawing Sheets

TOPOLOGICAL SURFACE DETECTOR

BACKGROUND INFORMATION

1. Field

The present disclosure relates generally to design, more specifically, to a method for identifying surfaces of elements within discretized mesh model.

2. Background

Computational or modeling meshes are commonly used across different design fields. A mesh is a collection of vertices, edges, and faces that defines the shape of an object. The faces typically consist of simple polygons such as triangles, quadrilaterals, etc. Example uses of meshes include vehicle modeling, computer-aided design (CAD), computer graphics, and computer animation.

Early concept design of a vehicle frequently requires a discretized mesh representation of the aircraft, vehicle, or subsystem for structural, fluid, thermal, or other analyses. The evaluation of different concept designs requires extensive analysis to be performed upon certain specific subcomponent parts or sections of the model.

Many forms of analysis require that certain geometric properties of the mesh are already known and understood. This means that the faces and/or vertices within the mesh representing specific parts, sections, or components of interest are known, usually by ID numbers that identify the various faces/vertices. Typically, geometric parts of interest are determined manually by exploring a mesh for the geometric components of interest, find the components, document the ID numbers, and then transmit them to whomever may need them for analysis.

Therefore, it would be desirable to have a method and apparatus that take into account at least some of the issues discussed above, as well as other possible issues.

SUMMARY

An illustrative embodiment of the present disclosure provides a method of identifying surfaces within a discretized mesh model. The method comprises identifying a number of faces in the mesh model and constructing an adjacency graph of connections between the faces. A value is assigned to each connection in the adjacency graph according to a metric of similarity between incident faces of the connection. Connections with a metric of similarity value that satisfies a prescribed policy of elimination are removed from the adjacency graph. From the remaining connections in the adjacency graph a number of strongly connected components in the mesh model are determined.

Another illustrative embodiment provides a system for identifying surfaces within a discretized mesh model. The system comprising a bus system, a storage device connected to the bus system, wherein the storage device stores program instructions, and a number of processors connected to the bus system, wherein the number of processors execute the program instructions to: identify a number of faces in the mesh model; construct an adjacency graph of connections between the faces; assign a value to each connection in the adjacency graph according to a metric of similarity between incident faces of the connection; remove from the adjacency graph connections with a metric of similarity value that satisfies a prescribed policy of elimination; and determine a number of strongly connected components in the mesh model from remaining connections in the adjacency graph.

Another illustrative embodiment provides a computer program product for identifying surfaces within a discretized mesh model. The computer program product comprises a non-volatile computer readable storage medium having program instructions embodied therewith, the program instructions executable by a number of processors to cause a number of computers to perform the steps of: identifying a number of faces in the mesh model; constructing an adjacency graph of connections between the faces; assigning a value to each connection in the adjacency graph according to a metric of similarity between incident faces of the connection; removing from the adjacency graph connections with a metric of similarity value that satisfies a prescribed policy of elimination; and determining a number of strongly connected components in the mesh model from remaining connections in the adjacency graph.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
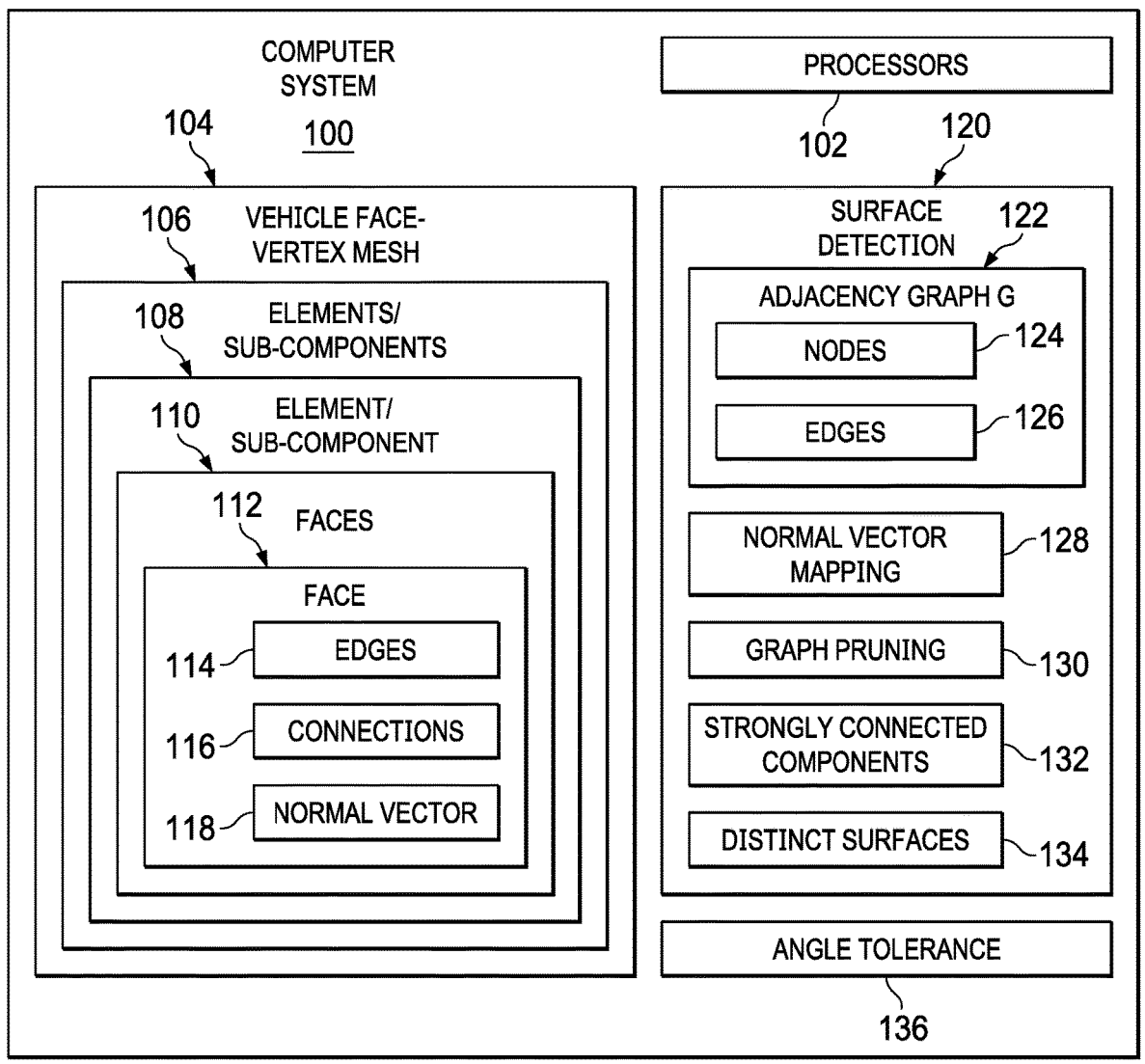
FIG. 1 is an illustration of a block diagram of a computer system for surface discovery for face-vertex meshes in accordance with an illustrative embodiment.

The illustrative embodiments recognize and take into account one or more different considerations. The illustrative embodiments recognize and take into account that the early concept design of a vehicle frequently requires a discretized mesh representation of the aircraft, vehicle, or subsystem for structural, fluid, thermal, or other analyses.

The illustrative embodiments recognize and take into account that additionally, the evaluation of different concept designs requires extensive analysis to be performed upon certain specific subcomponent parts or sections of the model. As an example, the analysis of a wing of an aircraft will require detailed information about the parts of a model composing the various stringer and rib members within the wing. Therefore, the ability to automatically identify or isolate specific subcomponent parts, sections, or pieces of a discretized mesh would enable and facilitate rapid analysis of early vehicle or subsystem concept design.

The illustrative embodiments recognize and take into account that many forms of analysis require that certain geometric parts of the mesh are already known and understood. This means that the faces and/or vertices within the mesh representing specific parts, sections, or components of interest are known, usually by ID numbers that identify the various faces/vertices. Typically, geometric parts of interest are determined manually, e.g., an engineer opens and explores a mesh for the geometric components of interest, finds the components, documents the ID numbers, and then transmits them to whomever may need them for analysis. More advanced approaches might include building up a loadable node set that identifies the ID numbers, and then passing the loadable node set on for analysis. However, this approach still requires manual determination of the corresponding IDs.

The illustrative embodiments recognize and take into account that a major drawback of the above methods is that changes made to a mesh almost certainly change the associated IDs that identify particular constituent components of interest. For example, updating the wing of an aircraft model, particularly when the design of the wing changes (perhaps adding stringers or removing ribs), will change the associated ID numbers, and hence the process of reestablishing the identity of the faces/vertices of interest for analysis must be re-performed. In an intensive design process that seeks to explore multiple vehicle designs or changes, the existing solutions cumulatively represents a substantial time loss in determining the components of interest.

A recent development that was made to improve upon these current solutions that introduces an automated methodology for identifying geometric regions of a vehicle (for example, the various stringers, ribs, and spars of a wing). This approach discovered various regions by examining all of the parts of the mesh and comparing geometric information to other surrounding parts, and does address a similar problem solved by this current disclosure. However, this previous work was focused particularly on the identification of components in a specific airplane configuration that required knowledge of the airplane axis system and required using conventions defined within this aircraft axis system (for example, the determination of 'fore-aft dominance' relative to the centroid of a rib), and also uses a very large search pattern for constructing these relationships.

The illustrative embodiments provide a method of identifying distinct geometric sections of a face-vertex mesh for early analysis on vehicle models during concept design. The illustrative embodiments identify components within a mesh model according to relative geometry within the framework of normal vectors formed by the surfaces themselves, irrespective of the actual vehicle geometry. The method of the illustrative embodiments can be applied to any system.

Using the example of a wing design, the individual components of the mesh representing the built-up stringers, ribs, spars and upper and lower surfaces must be discernible within the mesh to properly analyze. The illustrative embodiments can automatically resolve these components within a generic face-vertex mesh for an aircraft, vehicle, or subsystem of interest that needs internal geometric sections resolved easily and quickly.

The illustrative embodiments eliminate the dependency on predefined axis systems. The illustrative embodiments look for relative geometric similarity irrespective of any predefined axis system. Whereas the prior methods are limited to specific vehicle configurations by their axis conventions, the illustrative embodiments are not and can be applied directly to any system.

The illustrative embodiments provide a highly scalable method of detecting distinct geometric surfaces within a general discretized face-vertex mesh. The method can be applied to an entire airplane or other complex vehicle to automatically identify separate geometric regions within the vehicle without the computational drawbacks of many other approaches. The corresponding faces composing the various distinct subcomponent parts of a vehicle or section can be rapidly identified using this method. Each step can be performed efficiently on very large meshes because each step can be performed with an algorithm that is linear in the number of faces and/or edges in the mesh.

The illustrative embodiments also employ a graph-pruning approach that significantly cuts down the time involved for identifying the components and scales very well for much larger geometries.

Turning now to FIG. 1, an illustration of a block diagram of a computer system for surface discovery for face-vertex meshes in accordance with an illustrative embodiment.

Computer system 100 includes a mesh face-vertex mesh diagram 104 of a vehicle such as an aircraft. Face-vertex mesh 104 includes a number of elements/sub-components 106 corresponding to constituent parts of the vehicle in question.

Each element/sub-component 108 within the number of elements/sub-components 106 comprises a number of faces 110. Each face 112 within the number of faces 110 comprises a number of edges 114. The edges 114 might form a number of connections 116 between face 112 and other faces with faces 110. However, not all edges of a face necessarily form connections with other faces. Each face 112 also has a unique and well-defined normal vector 118 extending from its surface.

Computer system 100 comprises a number of processors 102 that execute instructions for performing surface detections 120 on face-vertex mesh 104.

Surface detection 120 comprises the construction of an adjacency graph G 122. The adjacency graph G 122 comprises a number of nodes 124 representing faces such as faces 110 in face-vertex mesh 104. The adjacency graph G 122 also comprises a number of edges 126 that represent geometric edges, such as edges 114, forming connections between faces.

Surface detection 120 also employs normal vector mapping 128 of faces in adjacency graph 122. By using the vector mapping 128 in combination with an angle tolerance threshold 136, surface detection 120 can perform graph pruning 130. Once the adjacency graph is pruned, strongly connected components 132 are determined to compute the distinct surfaces 134.

Relative to the prior solutions using manual intervention and ID conventions, the illustrative embodiments can be used on new models with updated configurations, regardless of any ID changes. Since the illustrative embodiments do not rely on ID patterns, which are frequently inconsistent between model changes and updates, the illustrative embodiments facilitate rapid analysis of new and updated design changes without the time lost to use these prior solutions.

The subtractive step in graph pruning 130 reduces what would normally represent a connectivity graph between the faces within a mesh into a graph that contains only elements that share common, distinct geometric surfaces. This approach scales well with very large meshes comprising thousands, millions, or more nodes/faces and can still identify components within a mesh more rapidly than other methods because algorithms exist that are linear in the number of vertices and edges.

Computer system 100 is a physical hardware system and includes one or more data processing systems. When more than one data processing system is present in computer system 100, those data processing systems are in communication with each other using a communications medium. The communications medium can be a network. The data processing systems can be selected from at least one of a computer, a server computer, a tablet computer, or some other suitable data processing system.

The illustration of computer system 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 2:
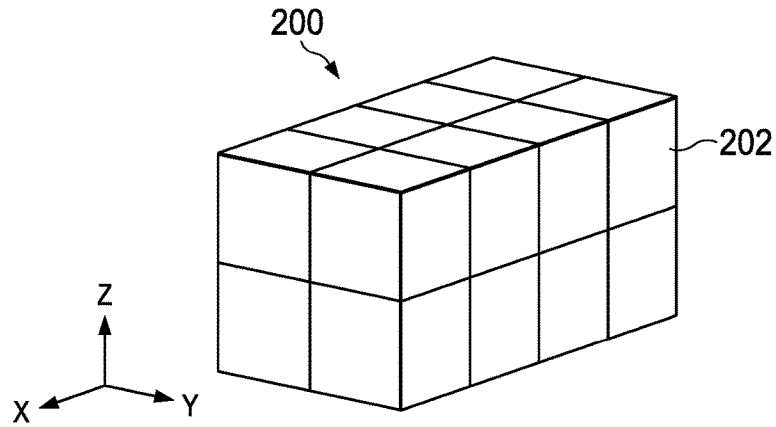
FIG. 2 illustrates a face-vertex mesh model in accordance with an illustrative embodiment.

FIG. 2 illustrates a face-vertex mesh model in accordance with an illustrative embodiment. The face-vertex mesh 200 is a simple representation of a closed "bookcase" that can be divided into major sections 202. Typical prior art systems have relied on conventions specific to certain design programs. For example, the ID numbering schemes require specific definitions of where certain sections exist, and if the product is modified or changed significantly, the ID scheme cannot be applied.

The illustrative embodiments use local geometric considerations, regardless of what system is being studied. Therefore, the resulting system will always be decomposed into constituent separated geometric regions, without requiring assumptions of certain program-specific or section-specific conventions.

The use of a subtractive graph-pruning step makes the system scale much better for very large geometries. Prior methods use direct searches, which can become prohibitively expensive for very large geometries such as realistic geometries for an entire aircraft. In contrast, the illustrative embodiments are not limited by searches since they construct connectivity-based graph information first and then prune the graph information in a subsequent step.

Figure 3:
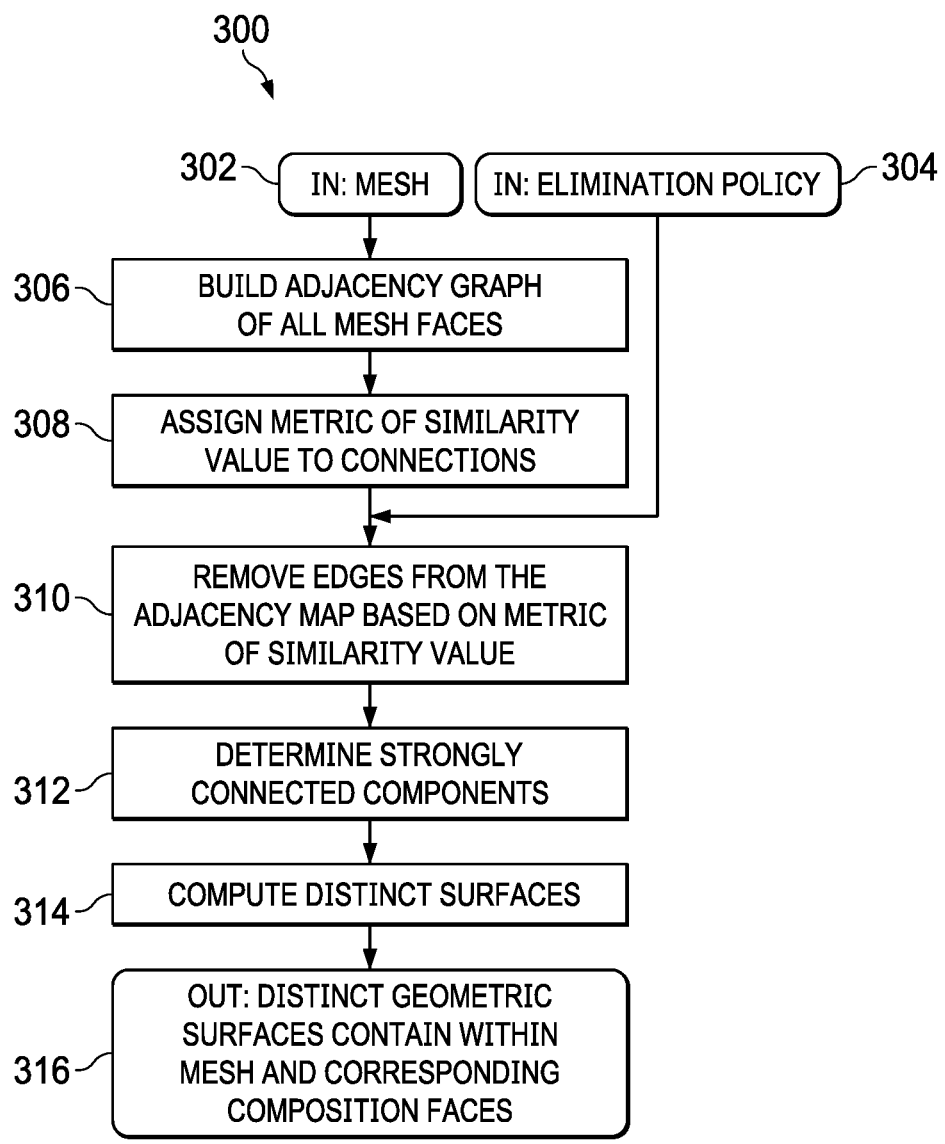
FIG. 3 depicts a flowchart for a process of identifying geometric surfaces within a face-vertex mesh in accordance with an illustrative embodiment.

FIG. 3 depicts a flowchart for a process of identifying geometric surfaces within a face-vertex mesh in accordance with an illustrative embodiment. Process 300 is an example of surface detection 120 shown in FIG. 1.

Process 300 begins with input of the finite element model bulk data file 302 representing the aircraft, vehicle, or subsystem of interest.

From the initial input 302, process 300 builds an adjacency graph of face connectivity (step 306). This step creates and returns a graph where the vertices represent separate faces within the mesh, and edges connecting various faces indicates a topological connection in the mesh itself between these faces. For example, two faces connected within the returned graph indicate that they share a common geometric node (explained in more detail below).

Next process 300 assigning a value to each connection in the adjacency graph according to a metric of similarity between incident faces of the connection (step 308). The metric of similarity between the incident faces of a connection can be derived from a number of parameters such as, e.g., normal vectors mapped to the faces, the number of vertices of the faces, the number of edges of the faces, surface curvature of the originating geometry, area, thickness, material composition (e.g., titanium, aluminum, etc.), if the face represent a isotropic material type, if the face represents an orthotropic material type, the material axis system, Young's modulus, shear modulus, and Poisson ratio.

Using the example of normal vectors, process 300 can map a unique corresponding normal vector to each incident face of the connection. The value assigned to this metric might be the angle subtended by the normal vectors or a scalar product of the normal vectors.

Process 300 removes (prunes) a subset of connections (graph edges) from the adjacency map that have metric of similarity values that satisfy a prescribed policy of elimination 304 (step 310). The elimination policy might comprise a specified threshold. If a metric of similarity value satisfies the policy of elimination by exceeding or falling below the threshold (depending on the metric in question), the corresponding connection is removed from the graph. Using the example of normal vectors, if the angle subtended by the normal vector exceeds a specified threshold in policy 304, the connection is removed from the graph. Alternatively, if the scalar product of the normal vectors is below a specified threshold in the elimination policy 304 the connection is removed from the graph. Because step 310 is a linear algorithm it scales with the number of edges in the graph.

From among the remaining edges in the adjacency graph, process 300 determines the strongly connected components (step 312). Mathematically, a graph is defined as strongly connected if every vertex is reachable from every other vertex in the graph. A strongly connected component is a sub-graph that is itself strongly connected. Strongly connected components in the adjacency graph can be determined using a linear algorithm such as Kosaraju's algorithm. Use of a linear algorithm allows process 300 to scale with large meshes since the algorithm is linear in the number of vertices and faces.

Process 300 uses the strongly connected components to calculate the distinct surfaces (step 314). This step can comprise any further analysis, calculation, or visualization (such as exploding the view of an aircraft or subsystem) of the obtained information.

The output 316 of process 300 is a set of lists identifying which elements in the finite element model coexist on the same geometric surface. This information can be used to explode and visualize the aircraft or vehicle surfaces, write out the collection of elements representing individual surfaces for further analysis, write out geometric information for the surfaces such as centroid, bounding box, length, area, or volume enclosed by sets of surfaces, or perform analytical calculations upon certain parts, subcomponents, or pieces of a vehicle or subsystem without requiring any further ID information.

Figure 4:
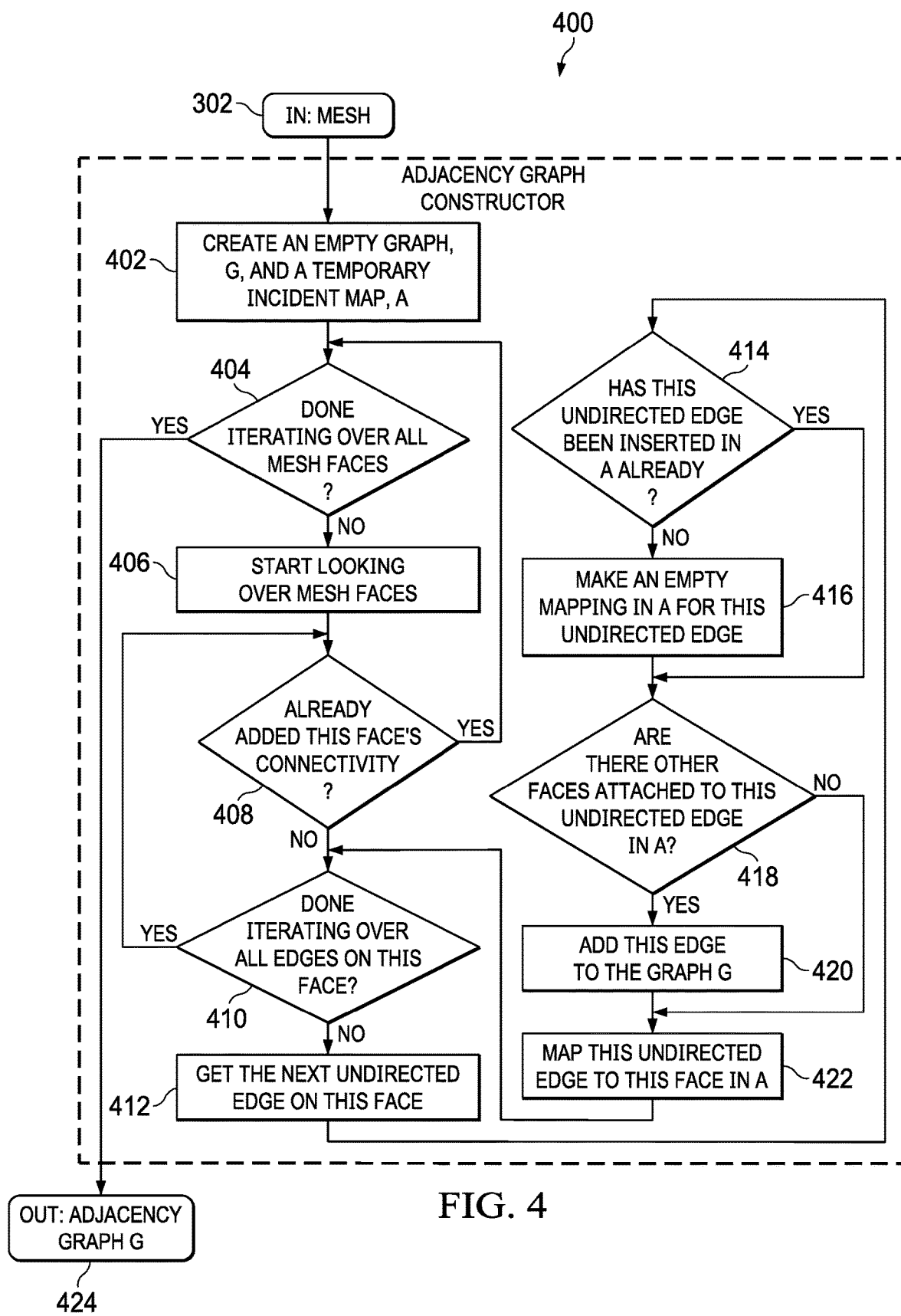
FIG. 4 depicts a flowchart for a process of constructing an adjacency graph in accordance with an illustrative embodiment.

FIG. 4 depicts a flowchart for a process of constructing an adjacency graph in accordance with an illustrative embodiment. Process 400 is a more detailed view of step 306 in FIG. 3.

Process 400 begins by constructing an empty adjacency graph G (the output) and a temporary incident map A that maps from an undirected edge to a set of faces that share this edge for constructing G (step 402).

Iteration over all faces in the mesh occurs (step 404). For each face in the mesh, the set of undirected edges between the geometric nodes on this face are gathered (step 406).

Figure 5:
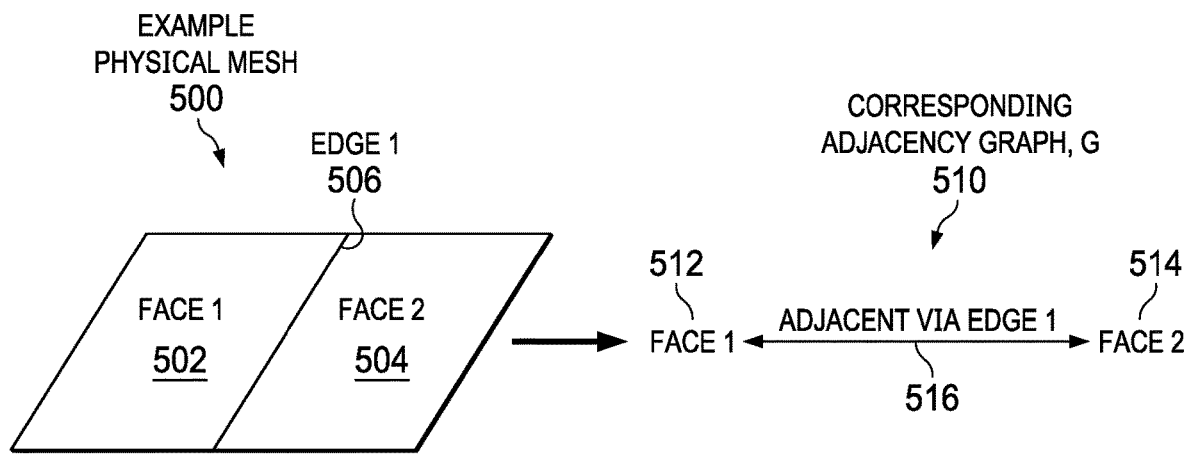
FIG. 5 illustrates an example of a physical mesh and corresponding adjacency graph with which an illustrative embodiment can be implemented.

FIG. 5 illustrates an example of a physical mesh and corresponding adjacency graph with which an illustrative embodiment can be implemented. FIG. 5 is present by way of background to better understand the process flow shown in FIG. 4.

In this simple example, only one edge 506 is shared between the face 1 502 and face 2 504 in physical mesh 500. The two nodes 512, 514 in the graph G 510 represent the faces 1 502 and 2 504, respectively.

Since there is a single edge 506 between the two faces 502, 504 in physical mesh 500, there is only one corresponding edge 516 in the adjacency graph G 510.

In the physical mesh 500, nodes are points in space, edges are line segments between two points, and faces are surfaces bounded by a closed set of edges. In the adjacency graph 510, however, the term 'node' represents a face in the physical mesh. Edges in an adjacency graph represent a shared edge (an edge that shares two nodes that are both members of two different faces). The adjacency graph exposes the shared edges representing which faces 'connect' or 'are adjacent' to each other physically.

Figure 6:
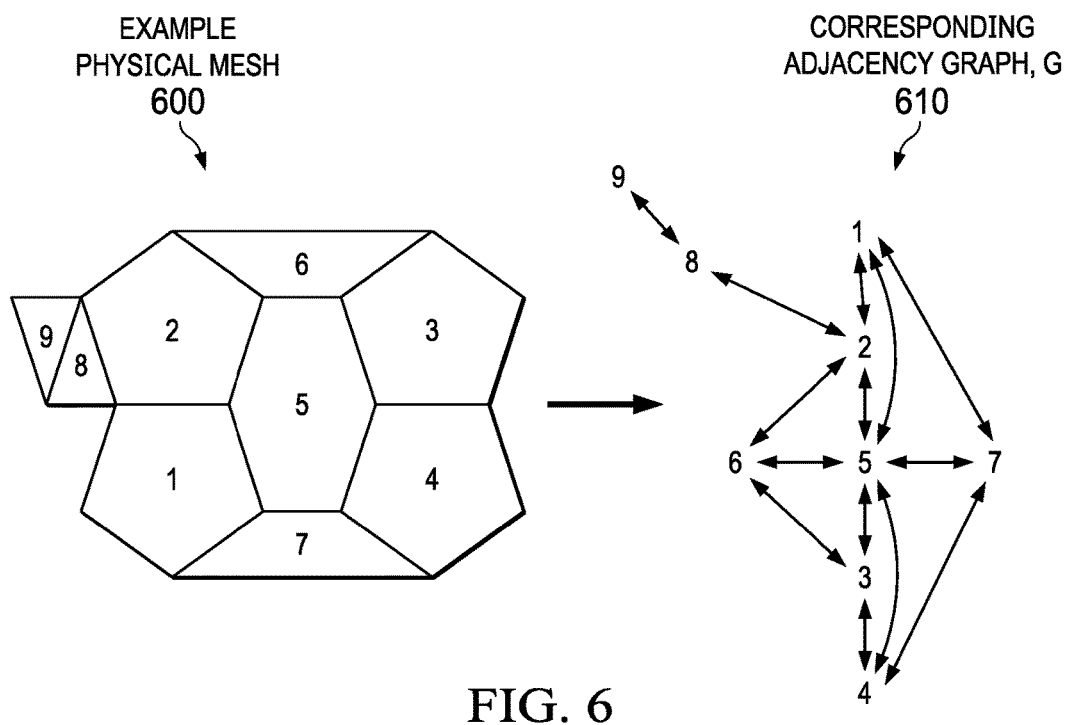
FIG. 6 illustrates an example of a physical mesh with elements of varying edge count with which an illustrative embodiment can be implemented.

FIG. 6 illustrates an example of a physical mesh with elements of varying edge count with which an illustrative embodiment can be implemented. In this case, physical mesh 600 comprises multiple mixed elements of varying edge count. This raises the complexity of the corresponding adjacency graph G 610 significantly in comparison to FIG. 5.

The faces in the physical mesh 600 become the nodes in the adjacency graph 610. The edges in the physical graph 600 are not present in the adjacency graph 610, but shared edges between two faces are represented by edges in the adjacency graph that connects the two. For example, element 2 shares an edge with elements 8, 1, 5, and 6. Therefore, there are correspondingly four edges in the adjacency graph G 610 from the node 2 (corresponding to face 2) to nodes 8, 1, 5, and 6.

Returning to FIG. 4, for each face, process 400 determines is the connectivity of the face has been added to the adjacency graph G (step 408). If not, process 400 determines if all edges on the face in question have been iterated (step 410).

If all edges have not yet been iterated, process 400 moves to the next undirected edge (step 412) and determines if the undirected edge has been inserted into temporary map A yet (step 414). If it has not been, an empty mapping for the undirected edge is made in A (step 416).

Iterating over each undirected edge, process 400 searches for any previously associated faces in the mapping A that share (are attached to) an undirected edge (step 418). If there are no other faces attached to (sharing) the undirected edge, the edge is mapped to the face in temporary map A (step 422).

If associated faces are found, then they must be connected to the current face. Therefore, the undirected edge is added to adjacency graph G to reflect the connectivity from the current face to the previously discovered face (step 420). Process 400 then adds the current face to the list of associated faces for the current undirected edge (step 422).

In this manner, process 400 builds up a mapping of all undirected edges and the associated faces that use these edges and uses this mapping as it is constructed while iterating over the faces to determine what faces are connected to other faces. The result is graph G 424, which provides the connections between different faces.

Iteration over all faces in the mesh, and over each face's set of undirected edges, produces rapid construction of the output graph G 424 of elements and their connectivity between each other. Map A is used temporarily for the construction and is discarded afterward.

Figure 7:
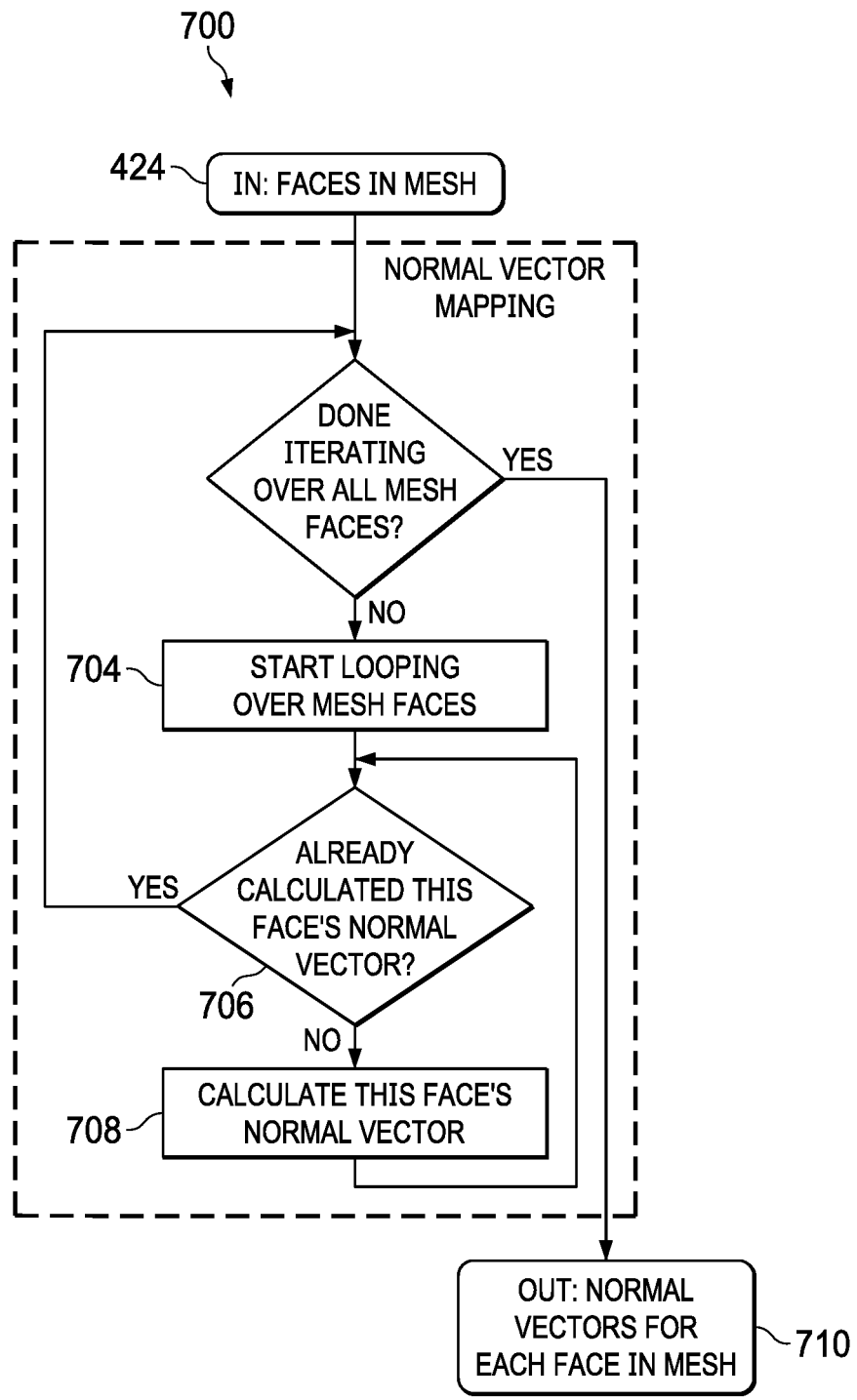
FIG. 7 depicts a flowchart for a process of mapping normal vectors in accordance with an illustrative embodiment.

FIG. 7 depicts a flowchart for a process of mapping normal vectors in accordance with an illustrative embodiment. Process 700 is a more detailed view of step 308 in FIG. 3 using the example of normal vectors as the metric of similarity. The steps in process 700 can be applied to other metrics of similarity between faces. In the present example, process 700 calculates the normal vector for each face in graph G 424 produced by process 400.

Similar to process 400, process 700 is iterative and loops over the all mesh faces in graph G (step 704).

For each face in the mesh, process 700 determines if the normal vector has been calculated for the next face (step 706). If not, process 700 calculates the face's normal vector (step 708). The normal vector is a vector that is perpendicular to the face and is defined by an engineering convention, such as node ordering, to ensure its uniqueness.

This iteration is continued until all mesh faces have been processed (step 702). The output 710 comprises normal vectors for each face in the mesh.

Figure 8:
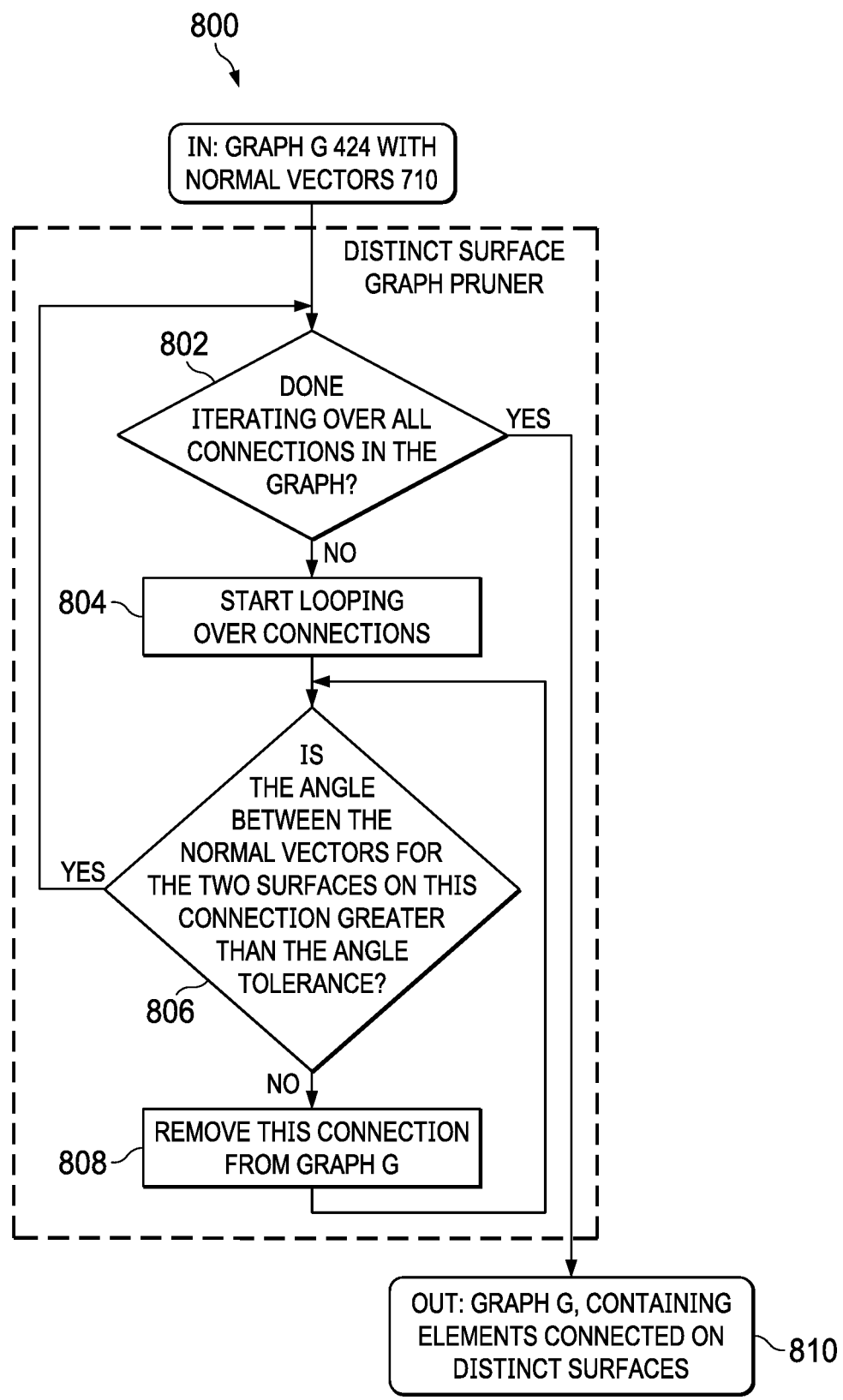
FIG. 8 depicts a flowchart of a process for reducing edges from an adjacency map in accordance with an illustrative embodiment.

FIG. 8 depicts a flowchart of a process for reducing edges from an adjacency map in accordance with an illustrative embodiment. Process 800 is a more detailed view of step 310 in FIG. 3, again using the example of normal vectors. Subtractive process 800 applies an elimination policy to metric of similarity values in order to reduce graph G to only those faces that share a common distinct surface connection.

From the previous steps, graph G contains all faces and their connectivity information, and the associated normal vectors (or other metric of similarity) for each face within the mesh.

In this example, process 800 iterates over all face connections within G and performs a scalar product comparison of the two normal vectors for each connection (step 804). The scalar product measures how closely the two surfaces are aligned.

For each connection, process 800 compares the angles between the normal vectors of the two surfaces at the connection to determine if they greater than an angle tolerance threshold (step 806). Scalar products with high values indicate surfaces very closely oriented to each other with possible small curvature changes. Low or zero scalar products indicate very different orientations for the surfaces.

If the angle between the normal vectors is less than the angle tolerance threshold (i.e. small or zero scalar product), the connection is removed from graph G (step 808). By removing cases of small or zero scalar products from graph G, process 800 provides a fast method of reducing all surfaces to only those containing distinct surfaces, contained in output 810.

Figure 9:
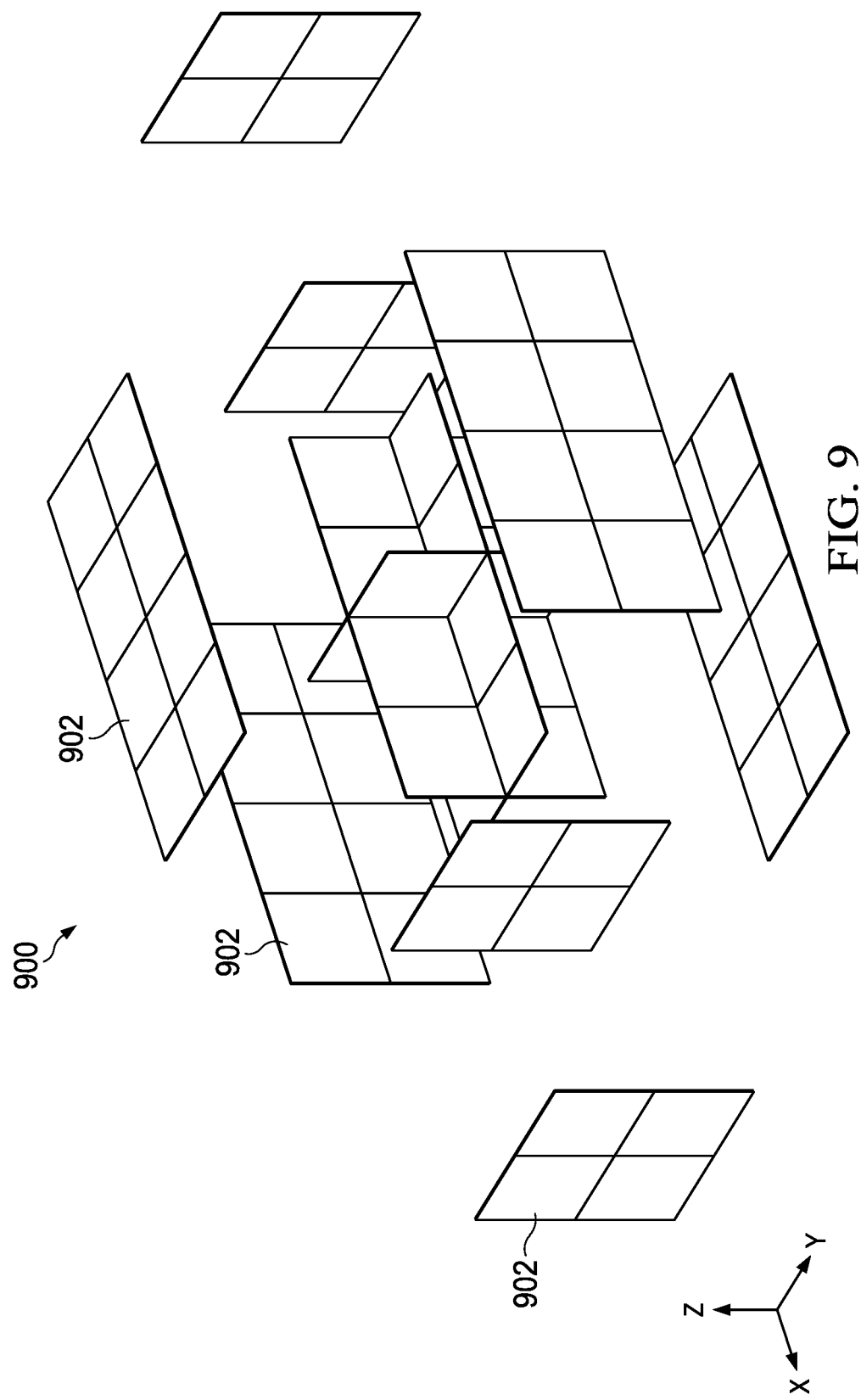
FIG. 9 depicts an exploded view diagram of geometric surfaces discovered from a mesh diagram in accordance with an illustrative embodiment.

FIG. 9 depicts an exploded view diagram of geometric surfaces discovered from a mesh diagram in accordance with an illustrative embodiment. After applying the mesh surface identification steps shown in FIGS. 3, 4, 7, and 8, the surfaces 902 discovered are shown as separate units in diagram 900, exploded away from their original positions in mesh 200 in FIG. 2. These geometric surfaces 902 can be displayed on a user interface for further analysis.

The illustrative embodiments enable engineers to rediscover geometrically connected sections automatically in the event of a design change, thus reducing the time required for exploring. The illustrative embodiments can be applied in an automated fashion every time a design changes to rediscover the surfaces and collection of IDs, helping to reduce the rework time associated with updating designs and allowing more design changes to be explored. Since the exploration of the IDs in a finite element model frequently requires using a commercial tool such as MSC Patran, the use of the illustrative embodiments helps to eliminate license consumption for such commercial packages.

The illustrative embodiments can be used for designing any product with a finite element method, or other computational techniques that require the identification of discrete components within a model. The illustrative embodiments can also be used in other contexts where there is a need for identifying discrete collections of points and/or elements that comprise common geometric faces, such as finding common geometric faces formed by large point set clouds.

Figure 10:
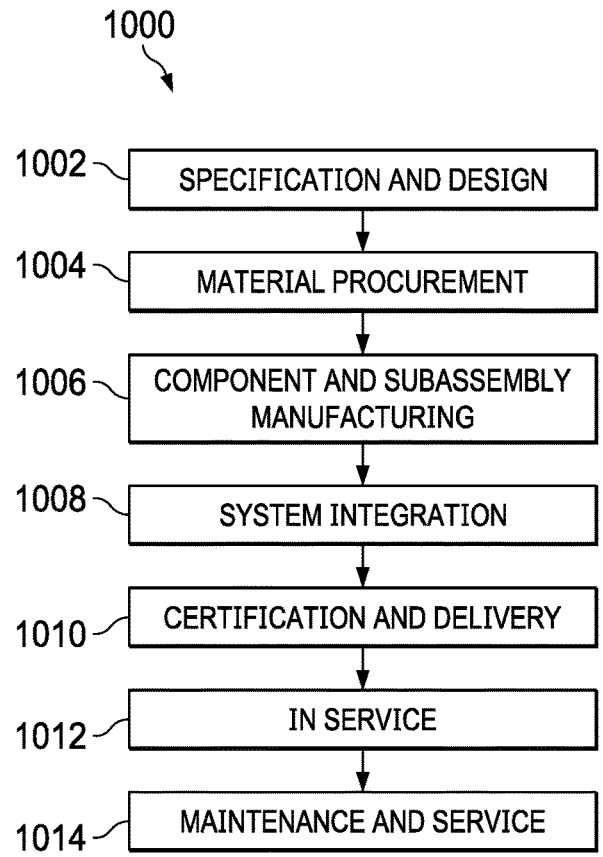
FIG. 10 is an illustration of an aircraft manufacturing and service method in a form of a block diagram in accordance with an illustrative embodiment.
Figure 11:
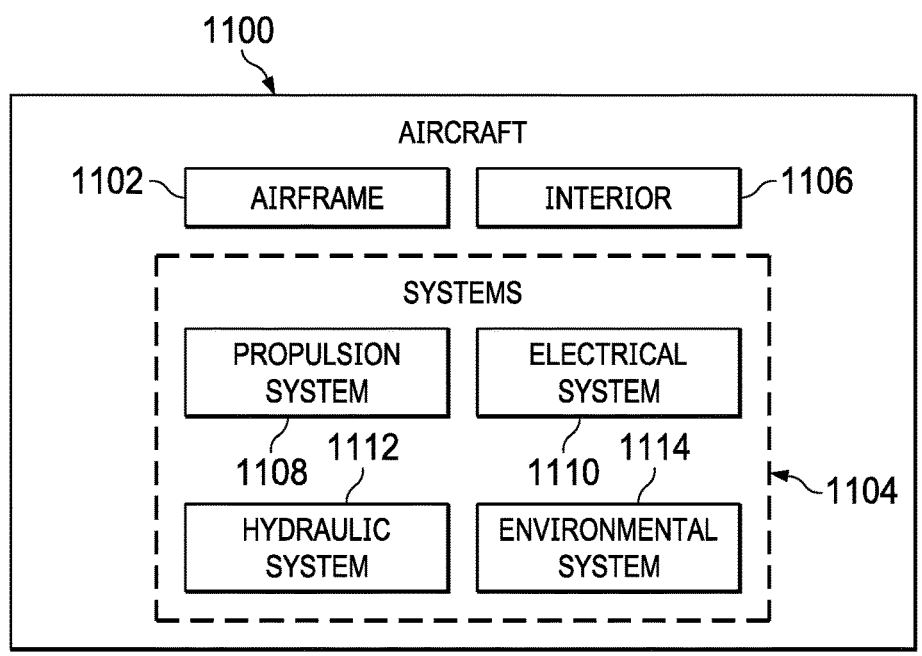
FIG. 11 is an illustration of an aircraft in a form of a block diagram in which an illustrative embodiment may be implemented.

Illustrative embodiments of the present disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in accordance with an illustrative embodiment. During preproduction, aircraft manufacturing and service method 1000 may include specification and design 1002 of aircraft 1100 in FIG. 11 and material procurement 1004.

During production, component and subassembly manufacturing 1006 and system integration 1008 of aircraft 1100 takes place. Thereafter, aircraft 1100 may go through certification and delivery 1010 in order to be placed in service 1012. While in service 1012 by a customer, aircraft 1100 is scheduled for routine maintenance and service 1014, which may include modification, reconfiguration, refurbishment, or other maintenance and service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an illustrative embodiment may be implemented. In this example, aircraft 1100 is produced by aircraft manufacturing and service method 1000 of FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000. One or more illustrative embodiments may be manufactured or used during at least one of component and subassembly manufacturing 1006, system integration 1008, in service 1012, or maintenance and service 1014 of FIG. 10.

Figure 12:
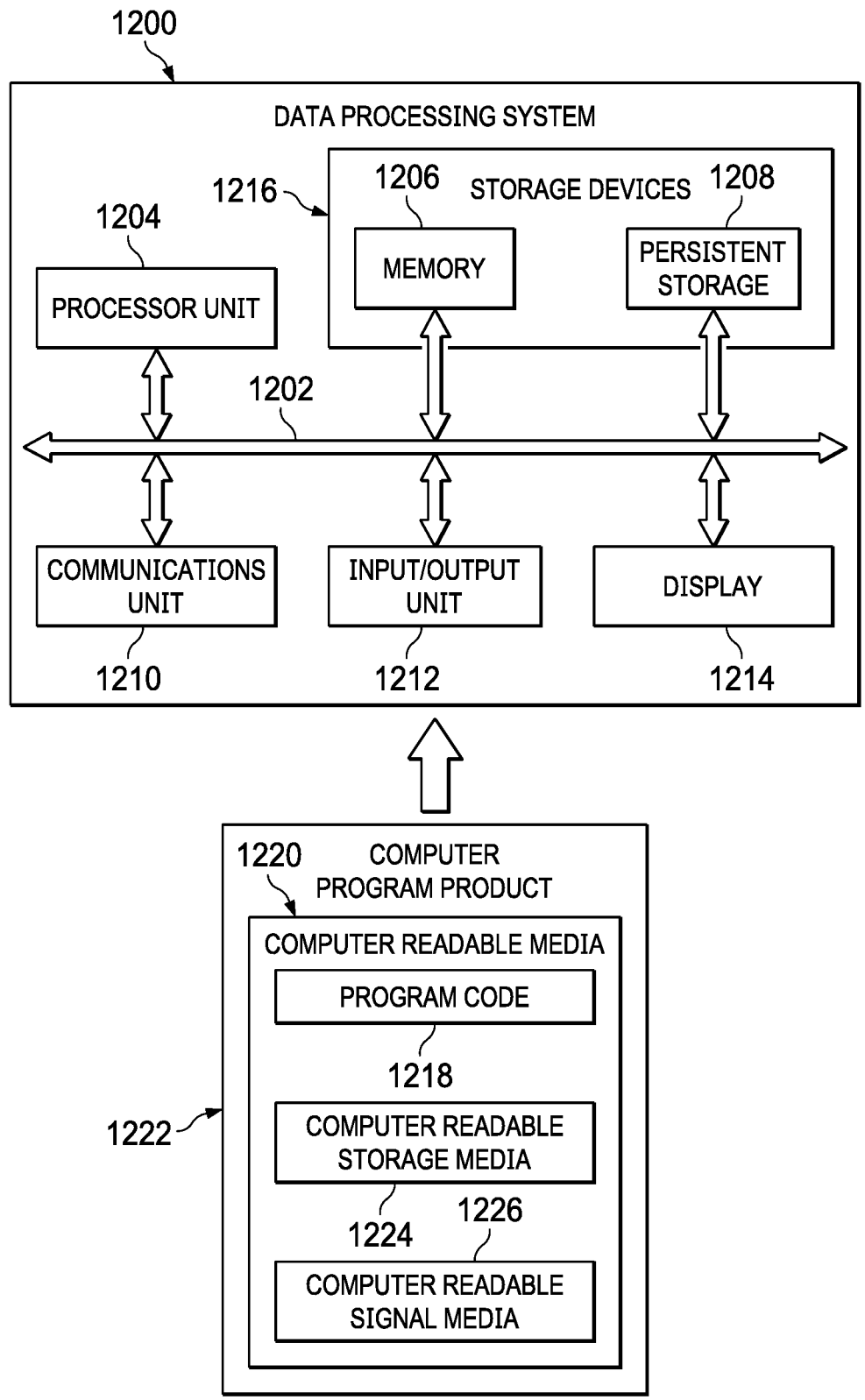
FIG. 12 depicts a block diagram of a data processing system in accordance with an illustrative embodiment.

Turning now to FIG. 12, an illustration of a block diagram of a data processing system is depicted in accordance with an illustrative embodiment. Data processing system might be an example of computer system 100 in FIG. 1. Data processing system 1200 might be used to implement one or more computers to carry out the process steps shown in FIGS. 3, 4, 7, and 8. In this illustrative example, data processing system 1200 includes communications framework 1202, which provides communications between processor unit 1204, memory 1206, persistent storage 1208, communications unit 1210, input/output unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation. In an embodiment, processor unit 1204 comprises one or more conventional general purpose central processing units (CPUs). In an alternate embodiment, processor unit 1204 comprises a number of graphical processing units (CPUs).

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208. Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 202. The processes of the different embodiments may be performed by processor unit 1204 using computer-implemented instructions, which may be located in a memory, such as memory 1206.

These instructions are referred to as program code, computer-usable program code, or computer-readable program code that may be read and executed by a processor in processor unit 1204. The program code in the different embodiments may be embodied on different physical or computer-readable storage media, such as memory 1206 or persistent storage 1208.

Program code 1218 is located in a functional form on computer-readable media 1220 that is selectively removable and may be loaded onto or transferred to data processing system 1200 for execution by processor unit 1204. Program code 1218 and computer-readable media 1220 form computer program product 1222 in these illustrative examples. In one example, computer-readable media 1220 may be computer-readable storage media 1224 or computer-readable signal media 1226.

In these illustrative examples, computer-readable storage media 1224 is a physical or tangible storage device used to store program code 1218 rather than a medium that propagates or transmits program code 1218. Alternatively, program code 1218 may be transferred to data processing system 1200 using computer-readable signal media 1226.

Computer-readable signal media 1226 may be, for example, a propagated data signal containing program code 1218. For example, computer-readable signal media 1226 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implement method of identifying surfaces within a discretized mesh model, the method comprising:
   identifying, by a number of processors, a number of faces in the mesh model;
   constructing, by the number of processors, an adjacency graph of connections between the faces;
   assigning, by the number of processors, a value to each connection in the adjacency graph according to a metric of similarity between incident faces of the connection;
   removing from the adjacency graph, by the number of processors, connections with a metric of similarity value that satisfies a prescribed policy of elimination;
   determining, by the number of processors, a number of strongly connected components in the mesh model from remaining connections in the adjacency graph;
   constructing a temporary incident map;
   mapping each undirected edge of each face to the temporary incident map;
   for each undirected edge of a face, determining if other faces share the undirected edge;
   if another face shares the undirected edge, mapping the undirected edge to the other face in the temporary incident map; and
   discarding the temporary incident map after all edges of all faces in the mesh model have been iterated.

2. The method of claim 1, wherein the adjacency graph comprises a number of nodes and a number of edges connecting the nodes, wherein each node represents a face in the mesh model and each edge presents a geometric edge shared by faces in the mesh model.

3. The method of claim 1, wherein assigning the value of the metric of similarity to a connection in the adjacency graph comprises:
mapping a unique normal vector for each incident face of the connection; and
calculating an angle subtended by the normal vectors, wherein the connection is removed from the adjacency graph if the angle is greater than a specified threshold.

4. The method of claim 1, wherein assigning the value of the metric of similarity to a connection in the adjacency graph comprises:
mapping a unique normal vector for each incident face of the connection; and
calculating a scalar product of the normal vectors, wherein the connection is removed from the adjacency graph if the scalar product is below a specified threshold.

5. The method of claim 1, wherein the metric of similarity between the incident faces of a connection is derived from at least one of:
normal vectors mapped to the faces;
number of vertices;
number of edges;
surface curvature of originating geometry;
area;
thickness;
material composition;
isotropic material type;
orthotropic material type;
material axis system;
Young's modulus;
shear modulus; or
Poisson ratio.

6. The method of claim 1, wherein the strongly connected component are identified according to a linear algorithm.

7. The method of claim 6, wherein the linear algorithm is Kosaraju's algorithm.

8. The method of claim 1, wherein surfaces are identified in the mesh model according to relative geometric similarity irrespective of any predefined axis system.

9. The method of claim 1, further comprising displaying, by the number of processors, geometric surfaces detected in the mesh model according to the strongly connected components.

10. A system for identifying surfaces within a discretized mesh model, the system comprising:
a bus system;
a storage device connected to the bus system, wherein the storage device stores program instructions; and
a number of processors connected to the bus system, wherein the number of processors execute the program instructions to:
identify a number of faces in the mesh model;
construct an adjacency graph of connections between the faces;
assign a value to each connection in the adjacency graph according to a metric of similarity between incident faces of the connection;
remove from the adjacency graph connections with a metric of similarity value that satisfies a prescribed policy of elimination;
determine a number of strongly connected components in the mesh model from remaining connections in the adjacency graph;
construct a temporary incident map;
map each undirected edge of each face to the temporary incident map;
for each undirected edge of a face, determine if other faces share the undirected
if another face shares the undirected edge, map the undirected edge to the other face in the temporary incident map; and
discard the temporary incident map after all edges of all faces in the mesh model have been iterated.

11. The system of claim 10, wherein the adjacency graph comprises a number of nodes and a number of edges connecting the nodes, wherein each node represents a face in the mesh model and each edge presents a geometric edge shared by faces in the mesh model.

12. The system of claim 10, wherein assigning the value of the metric of similarity to a connection in the adjacency graph comprises the processors executing instructions to:
map a unique normal vector for each incident face of the connection; and
calculate an angle subtended by the normal vectors, wherein the connection is removed from the adjacency graph if the angle is greater than a specified threshold.

13. The system of claim 10, wherein assigning the value of the metric of similarity to a connection in the adjacency graph comprises the processors executing instructions to:
map a unique normal vector for each incident face of the connection; and
calculate a scalar product of the normal vectors, wherein the connection is removed from the adjacency graph if the scalar product is below a specified threshold.

14. The system of claim 10, wherein the metric of similarity between the incident faces of a connection is derived from at least one of:
normal vectors mapped to the faces;
number of vertices;
number of edges;
surface curvature of originating geometry;
area;
thickness;
material composition;
isotropic material type;
orthotropic material type;
material axis system;
Young's modulus;
shear modulus; or
Poisson ratio.

15. The system of claim 10, wherein the strongly connected component are identified according to a linear algorithm.

16. The system of claim 15, wherein the linear algorithm is Kosaraju's algorithm.

17. The system of claim 10, wherein surfaces are identified in the mesh model according to relative geometric similarity irrespective of any predefined axis system.

18. The system of claim 10, wherein the processors further execute instructions to display geometric surfaces detected in the mesh model according to the strongly connected components.

19. A computer program product for identifying surfaces within a discretized mesh model, the computer program product comprising:
a non-transient computer readable storage medium having program instructions embodied therewith, the program instructions executable by a number of processors to cause a number of computers to perform the steps of:
identifying a number of faces in the mesh model;

constructing an adjacency graph of connections between the faces;
assigning a value to each connection in the adjacency graph according to a metric of similarity between incident faces of the connection;
removing from the adjacency graph connections with a metric of similarity value that satisfies a prescribed policy of elimination;
determining a number of strongly connected components in the mesh model from remaining connections in the adjacency graph;
constructing an empty adjacency graph;
iterating through all faces in the mesh model;
iterating through all edges of each face; and
if an edge of a face is shared by another face, adding the edge to the adjacency graph as a connection;
constructing a temporary incident map;
mapping each undirected edge of each face to the temporary incident map;
for each undirected edge of a face, determining if other faces share the undirected
if another face shares the undirected edge, mapping the undirected edge to the other face in the temporary incident map; and
discarding the temporary incident map after all edges of all faces in the mesh model have been iterated.

20. The computer program product of claim 19, wherein the adjacency graph comprises a number of nodes and a number of edges connecting the nodes, wherein each node represents a face in the mesh model and each edge presents a geometric edge shared by faces in the mesh model.

21. The computer program product of claim 19, wherein assigning the value of the metric of similarity to a connection in the adjacency graph comprises instructions for:
mapping a unique normal vector for each incident face of the connection; and
calculating an angle subtended by the normal vectors, wherein the connection is removed from the adjacency graph if the angle is greater than a specified threshold.

22. The computer program product of claim 19, wherein assigning the value of the metric of similarity to a connection in the adjacency graph comprises instructions for:
mapping a unique normal vector for each incident face of the connection; and
calculating a scalar product of the normal vectors, wherein the connection is removed from the adjacency graph if the scalar product is below a specified threshold.

23. The computer program product of claim 19, wherein the metric of similarity between the incident faces of a connection is derived from at least one of:
normal vectors mapped to the faces;
number of vertices;
number of edges;
surface curvature of originating geometry;
area;
thickness;
material composition;
isotropic material type;
orthotropic material type;
material axis system;
Young's modulus;
shear modulus; or
Poisson ratio.

24. The computer program product of claim 19, wherein the strongly connected component are identified according to a linear algorithm.

25. The computer program product of claim 24, wherein the linear algorithm is Kosaraju's algorithm.

26. The computer program product of claim 19, wherein surfaces are identified in the mesh model according to relative geometric similarity irrespective of any predefined axis system.

27. The computer program product of claim 19, further comprising instructions for displaying geometric surfaces detected in the mesh model according to the strongly connected components.

* * * * *